W. A. WICKS.
Making Sheet-Metal Cans.
No. 230,726.  Patented Aug. 3, 1880.
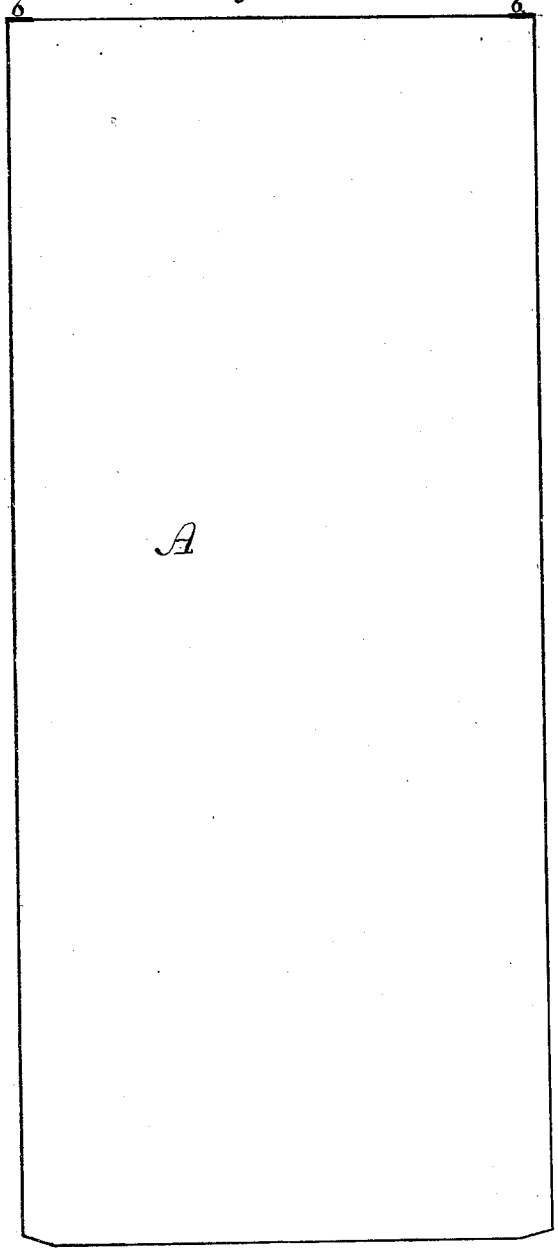
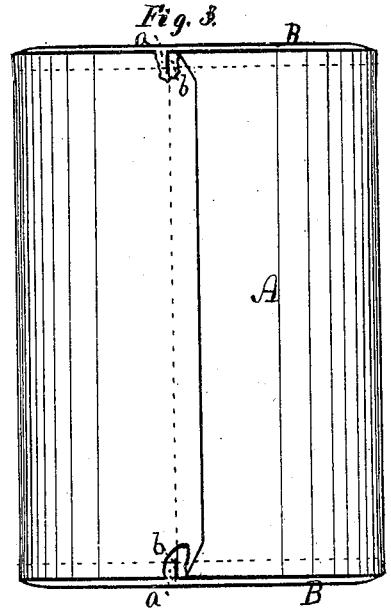
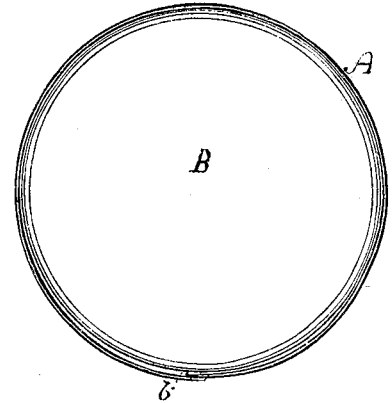

UNITED STATES PATENT OFFICE.

WILLIAM A. WICKS, OF BALTIMORE, MARYLAND.

MAKING SHEET-METAL CANS.

SPECIFICATION forming part of Letters Patent No. 230,726, dated August 3, 1880.

Application filed January 12, 1880.

*To all whom it may concern:*

Be it known that I, WILLIAM A. WICKS, of the city and county of Baltimore, and State of Maryland, have invented a new and useful Improvement in Making Sheet-Metal Cans and Vessels; and I do hereby declare that the following is a full and exact description thereof, reference being had to the accompanying drawings, making part of this specification.

Figure 1 is a side view of a sheet of metal cut to the proper size for forming the body of a can and prepared for use according to my improvement; Fig. 2, an end view of a number of such sheets held together while being prepared for use by my improved method; Fig. 3, a side view of a can constructed with one of the said prepared sheets of metal, as hereinafter described, a portion of the body being shown as broken away to show the interior construction; Fig. 4, an end view of the same.

Like letters designate corresponding parts in all of the figures.

My improvement relates to that class of sheet-metal cans or vessels in which the ends or heads are placed inside of the body or periphery of the can, instead of the outside thereof, before soldering. In cans or vessels of this class the large sheets of metal are taken and cut to proper size, then bent into proper shape, then soldered along the side seam, leaving the ends of the can or vessel body thus formed a little flared to receive the ends or heads thereof.

The improvement also relates to that process of making cans or vessels in which the heads are soldered by simple heat or flame and without the use of a soldering-tool. In this process, as usually practiced, the heads of the cans are soldered in while the can is being revolved in an upright position, a strong heating-flame being applied at or near the corner where the body joins the head, the solder dropping or descending from a holder or tube above and being quickly melted and flowing all around in the seam. On account of this method of applying the heat no flux in a water solution (like muriate of zinc or tin) can be used, because the water would be evaporated before the metal could be sufficiently heated to melt the solder and unite the metallic surfaces. It is therefore usual to employ a resinous flux; but with such a flux the solder will not so readily and surely run through the lap and adhere to any naked or uncoated surfaces occurring at the lapped ends of the can-bodies, especially at the inner edge of the side seam of the can-body, where there is necessarily an opening of the thickness of the sheet of metal used to fill with the solder, without the pressure and friction of a soldering tool or instrument.

It is well known that plates of tin, so called, and so generally used for making cans, are made by coating thin sheets of iron with the metal tin, and when these sheets are cut, to obtain the proper sizes for different cans or vessels, the iron between the thin tin coating or plating is left exposed. It is just at the inside edges or corners of the sheet, which come in contact with the head of the can, where the exposed iron has not been coated, that leakages in this class of cans usually occur, for the reason above indicated, and this sometimes to such an extent as to destroy the entire profit in the manufacture of cans.

My improvement consists in covering or coating the exposed iron edges of the sheets A, forming the body of the can or vessel, at the two underlapped corners *b b* thereof, with common solder or other soft metal or alloy, applied with a soldering-tool before the side seam of the body is soldered, and preferably before the sheet or blank is bent into form. It is only necessary to coat the edges for a short distance from the corners, sufficient to extend along the width of the adjoining flange *a* of the heads B B when they are inserted in the body; and in order to save labor a number of the sheets A are prepared at once by placing them together, as shown at *b b* in Fig. 2.

This mode of applying the solder or soft metal to the edges of the sheets also effects an important result in addition to facility and economy of manipulation, for by thus applying the solder to the edges of the sheets when laid close together the solder is prevented from running over upon the sides of the sheets, which if permitted would make beads or a continuous thickening of the sheets, thereby preventing the ends of the sheets from lying close together in forming the side seam of the can-body and increasing the thickness of the opening at the inner lapped edge, and consequently increasing the difficulty of filling the space with solder to make a tight joint; and sometimes, when the space is of considerable thickness, the solder will run through by gravity and be wasted thereby, and will adulterate the food inside with small particles of the metal.

By this method I find that the cans or vessels under pressure remain without leakage, and that the difficulty is thereby effectually remedied.

I am aware that the ends of can-bodies the inner surfaces of which were previously uncoated with soft metal have been dipped in soft metal to coat the said inner surfaces where the heads were to come in contact, so that the parts could be successfully soldered together, and also that the entire blanks of which cans were to be made have been dipped in soft metal, either to coat the entire surfaces or the entire edges thereof; but such processes, besides being entirely too expensive for practical application in the manufacture of preserve-cans in the present state of the art, could not be successfully applied, in fact, with the improved and rapid means now in use, as indicated in the first part of this specification, because not only would the daubing and thickening of the sheets at the edges prevent the formation of the closely-fitting and thoroughly-soldered joints of the cans necessary to withstand the pressure of a whole atmosphere and the severe handling to which they are subjected in transportation, but the solder thus adhering to the edges of the blanks would prevent their being folded and creased in the automatic machines now used in the art.

What I claim as my invention, and desire to secure by Letters Patent, is—

1. The process of preparing body-blanks for sheet-metal cans which consists in coating with soft metal those portions only of the raw edges of the blank which in the completed can are on the under lap of the side seam, and are adjacent to that portion of the can-heads which rests against the side seam of the body, substantially as and for the purpose herein specified.

2. A body-blank for sheet-metal cans and vessels cut in form for use, and having only those portions of the raw edges covered with soft metal which are to be lapped inside in forming the side seam of the body, and which are to be adjacent to the joints of the heads of the can when inserted, substantially as and for the purpose herein specified.

3. The process of coating blanks for sheet-metal vessels at those portions of their raw edges which rest against joints in the completed vessel, which consists in placing the sheets closely side by side and applying the coating of metal over the edges thereof, to prevent the running of the metal over the sides of the sheets, substantially as and for the purpose herein specified.

The foregoing specification signed by me this 9th day of January, 1880.

WILLIAM A. WICKS.

Witnesses:
JNO. T. MADDOX,
CHARLES S. MORAN.